United States Patent
Lee et al.

(10) Patent No.: US 7,041,518 B2
(45) Date of Patent: May 9, 2006

(54) LOW-TEMPERATURE FORMATION METHOD FOR EMITTER TIP INCLUDING COPPER OXIDE NANOWIRE OR COPPER NANOWIRE AND DISPLAY DEVICE OR LIGHT SOURCE HAVING EMITTER TIP MANUFACTURED USING THE SAME

(75) Inventors: Ho-Young Lee, Seoul (KR); Yong-Hyup Kim, Yongin-si (KR); Woo Yong Sung, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 0 days.

(21) Appl. No.: 10/746,358

(22) Filed: Dec. 24, 2003

(65) Prior Publication Data

US 2004/0147049 A1    Jul. 29, 2004

(30) Foreign Application Priority Data

Dec. 26, 2002    (KR)    ............... 10-2002-0084063

(51) Int. Cl.
   *H01L 21/00*    (2006.01)
(52) U.S. Cl. .......................................... 438/20; 445/24
(58) Field of Classification Search ................ 438/20; 445/24, 50, 51
   See application file for complete search history.

(56) References Cited

U.S. PATENT DOCUMENTS 5,923,948 A * 7/1999 Cathey, Jr. ................ 438/20
6,250,984 B1 * 6/2001 Jin et al. .................... 445/51
6,863,942 B1 * 3/2005 Ren et al. ................ 428/36.9

FOREIGN PATENT DOCUMENTS

| JP | 02-262220 | 10/1990 |
| JP | 06-089651 | 3/1994 |
| KR | 2001-11136 | 2/2001 |
| KR | 2001-51096 | 6/2001 |
| KR | 10-2000-0069893 | 5/2002 |
| KR | 10-2002-0003098 | 7/2003 |

OTHER PUBLICATIONS

PCT International Search Report for Lee, et al., Int'l Application No. PCT/KR2003/002829, Filed Dec. 24, 2003, Dated Mar. 30, 2004.

* cited by examiner

*Primary Examiner*—Tuan H. Nguyen
(74) *Attorney, Agent, or Firm*—Law Offices of Albert Wai-Kit Chan, LLC (57) ABSTRACT

Provided are a low-temperature formation method for emitter tips including copper oxide nanowires or copper nanowires and a display device or a light source manufactured using the same. The low-temperature formation method includes preparing a substrate having an exposed copper surface. The copper surface contacts an oxide solution at a low temperature of 100° C. or less to grow copper oxide nanowires on the surface of the substrate. Optionally, a reduction gas or a heat is supplied to the copper oxide nanowires, or plasma processing is performed on the copper oxide nanowires, thereby reducing the copper oxide nanowires to copper nanowires. Thus, emitter tips including copper oxide nanowires or copper nanowires are formed densely at a low temperature such that the emitter tips have a shape and length suitable for emission of electrons.

11 Claims, 8 Drawing Sheets

LOW-TEMPERATURE FORMATION METHOD FOR EMITTER TIP INCLUDING COPPER OXIDE NANOWIRE OR COPPER NANOWIRE AND DISPLAY DEVICE OR LIGHT SOURCE HAVING EMITTER TIP MANUFACTURED USING THE SAME

This application claims the priority of Korean Patent Application No. 2002-84063, filed on, Dec. 26, 2002, in the Korean Intellectual Property Office, the disclosure of which is incorporated herein by reference in their entirety.

BACKGROUND OF THE INVENTION

1. Field of the Invention

The present invention relates to a low-temperature formation method for emitter tips including copper oxide nanowires or copper nanowires and a display device or a light source having the emitter tips manufactured using the same.

2. Description of the Related Art

A display device, such as a field emission display (FED), a vacuum fluorescent display (VFD), and a cathode ray tube (CRT), or a light source, such as a white light source and a backlight lamp of a liquid crystal display (LCD), requires emitter tips, which emit electrons if a predetermined intensity of electric field is applied thereto.

In recent years, carbon nanotubes have been strongly relied upon as new emitter tips because the carbon nanotubes have an emitting voltage that is several tens times as low as that of conventional emitter tips, but have an emitting current that is several tens to several hundred times as high as that of the conventional emitter tips. However, carbon nanotubes have been conventionally manufactured using a high-temperature process, for example, at a temperature of 700° C. or higher. For this reason, it is impossible to form carbon nanotubes on a glass substrate, which is widely used as a substrate of various display devices or light sources and has a strain temperature of 650° C. or less. For example, a high-intensity glass has a strain temperature of 650° C. or less, a typical glass has a strain temperature of 570° C. or less, and a soda lime glass has a strain temperature of 550° C. or less. Unless a glass substrate is used, the manufacture of carbon nanotubes is very likely to have technical and economical problems. Accordingly, a formation temperature of emitter tips must be less than a strain temperature of a glass substrate. Although there are known methods for lowering a formation temperature of carbon nanotubes to a temperature of 500° C. by using an appropriate gas and a heating process or a plasma-enhanced chemical vapor deposition (PECVD), it is still difficult to form densely carbon nanotubes without containing impurities at the temperature of 500° C.

Also, to facilitate the emission of electrons, ends of emitter tips should be as pointed as possible, and the length thereof should be not more than an appropriate length of an emitting source.

Therefore, a new method capable of solving the foregoing problems is required.

SUMMARY OF THE INVENTION

The present invention provides a low-temperature formation method for emitter tips, in which emitters can be formed densely a low temperature that is no more than a strain temperature of a substrate. In this method, the emitter tips can have a length and shape suitable for emission of electrons.

The present invention also provides a display device or a light source including the emitter tips manufactured using the foregoing low-temperature formation method.

According to an aspect of the present invention, there is provided a low-temperature formation method for emitter tips including copper oxide nanowires or copper nanowires, the method comprising preparing a substrate having an exposed copper surface. The copper surface contacts an oxide solution at a low temperature of 100° C. or less to grow copper oxide nanowires on the surface of the substrate. Optionally, a reduction gas may be supplied to the copper oxide nanowires or plasma processing may be performed on the copper oxide nanowires at a temperature of 450° C. or less, thereby reducing the copper oxide nanowires to copper nanowires.

The oxide solution can be a mixture of a $NaCl_2$ water solution and a NaOH water solution and may further include a $Na_3PO_4$ water solution.

The reduction gas or a plasma generating gas can be a $H_2$ gas.

According to another embodiment of the present invention, there is provided a display device or a light source, which comprises emitter tips including copper oxide nanowires or copper nanowires, which are manufactured using the above-described low-temperature formation method for emitter tips.

BRIEF DESCRIPTION OF THE DRAWINGS

The above object and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art. In the drawings, the thicknesses of layers may be exaggerated for clarity, and the same reference numerals are used to denote the same elements throughout the drawings.

Firstly, a low-temperature formation method for emitter tips including copper oxide nanowires will be described. In the present invention, emitter tips including copper oxide nanowires are formed using low-temperature solution oxidation. Specifically, a surface of a copper layer, which is formed on a surface of a bare copper substrate or a substrate, contacts an oxide solution at a low temperature of 100° C. or less, thus causing an oxidation reaction. This oxidation reaction is performed in a bath, which contains the oxide solution and is maintained at a temperature of 100° C. or less, i.e., using a dipping method.

The oxide solution used for the oxidation reaction is preferably a mixture of a $NaClO_2$ water solution of about 26 weight % to 32 weight % and a NaOH water solution of about 1.6 weight % to 2 weight %. The $NaClO_2$ water solution and the NaOH water solution are preferably mixed in a volume ratio of 1 to 1.

Alternatively, the oxide solution is preferably a mixture of a $NaClO_2$ water solution of about 10 weight % to 11.25 weight %, a NaOH water solution of about 1.7 weight % to 1.8 weight %, and a $Na_3PO_4.12H_2O$ of about 23 weight % to 30 weight %. In this case, the $NaClO_2$ water solution, the NaOH water solution, and the $Na_3PO_4.12H_2O$ are preferably mixed in a volume ratio of 1 to 1 to 1.

The concentration and the volume ratio of each of the water solutions constituting the oxide solution are not limited to the above description, but can be appropriately changed by those skilled in the art.

The oxidation reaction is performed for an amount of time of 2 to 4 minutes. If the mixture of the $NaClO_2$ water solution and the NaOH water solution is used, the oxidation reaction is preferably performed for about 2 minutes. This is because even if the oxidation reaction is performed for more than 2 minutes, the copper oxide nanowires do not grow to 1 µm or more, preferably 0.8 µm or more, due to self-limiting growth.

Figure 1:
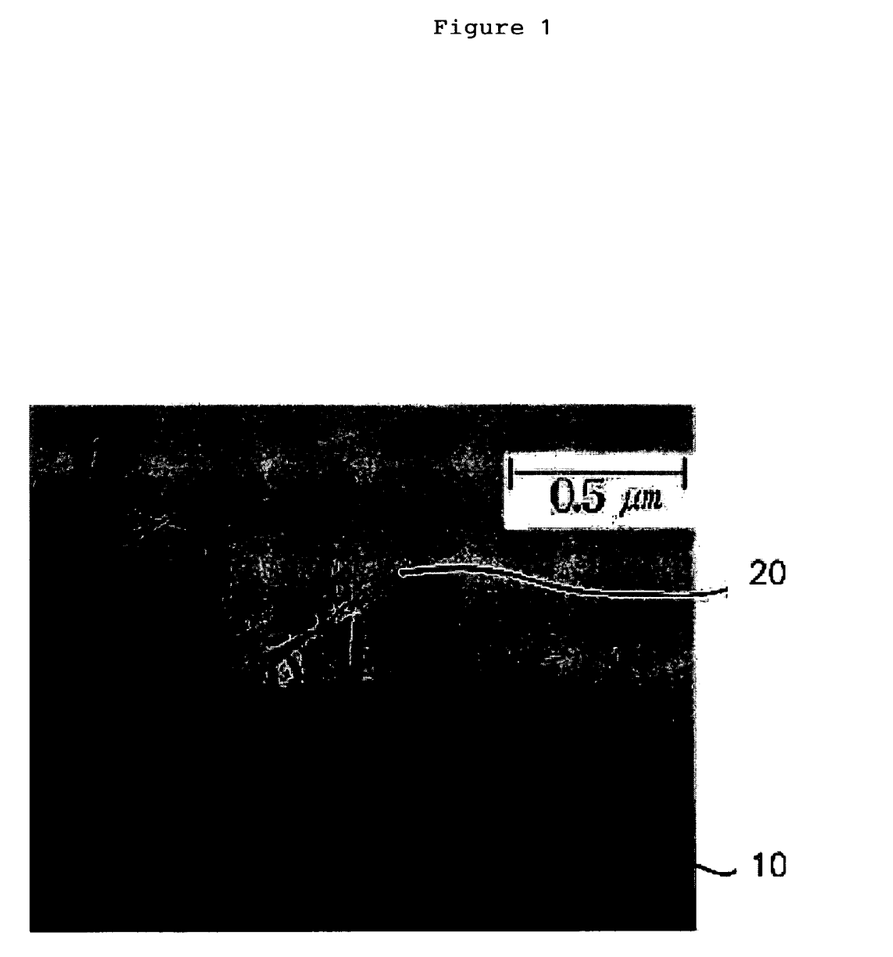
FIG. 1 is a transmission electron microscopes (TEM) photograph of copper oxide nanowires manufactured using a low-temperature formation method for emitter tips according to the present invention.

FIG. 1 is a TEM photograph of copper oxide nanowires, the photograph taken after performing low-temperature solution oxidation on a copper substrate, which is dipped in an oxide solution and maintained at a temperature of 70° C. Here, the oxide solution is obtained by mixing a $NaClO_2$ water solution(320 g/distilled water 1 L) and a NaOH water solution(20 g/distilled water 1 L) in a volume ratio of 1:1. It can be confirmed that very pointed and thin cooper oxide nanowires 20 grew densely on the substrate 10. The length of the copper oxide nanowires 20 was 0.8 µm at most.

In the low-temperature solution oxidation of the present invention, the copper oxide nanowires can be formed densely at a low temperature of 100° C. or less without an additional complicated apparatus. Also, the copper oxide nanowires can be formed in a pointed shape suitable for emitter tips. Further, the copper oxide nanowires can grow to a length of 1 µm or less, which is suitable for emitter tips, due to the self-limiting growth.

Figure 2:
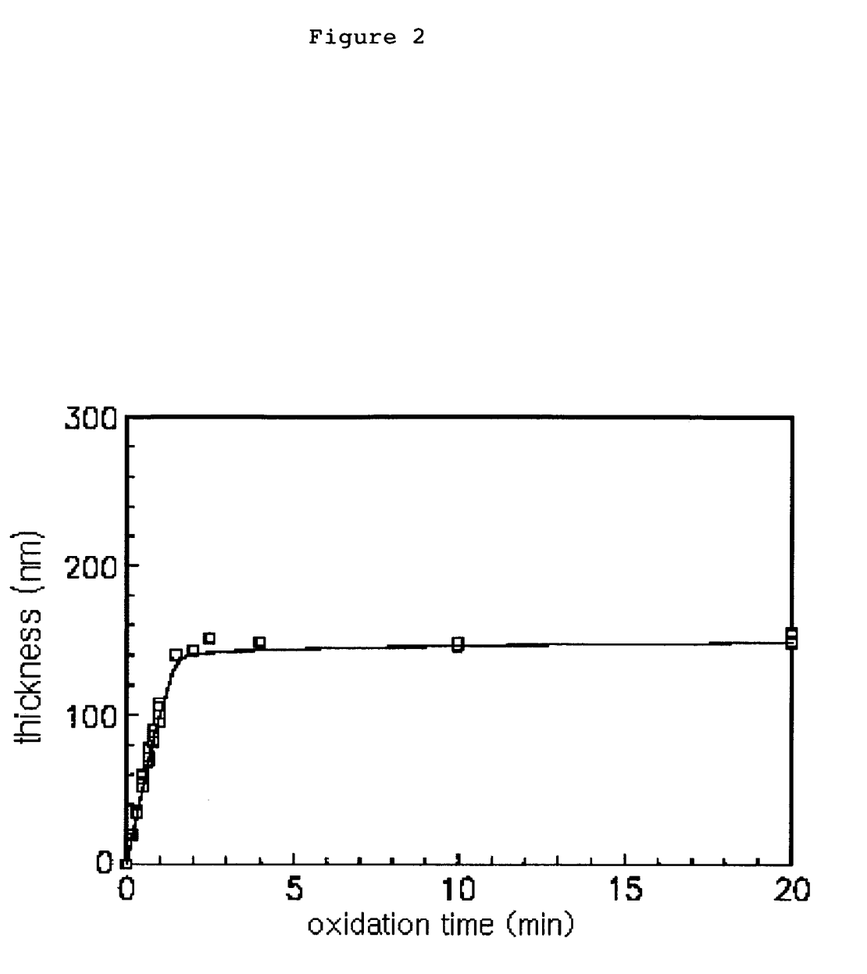
FIG. 2 is a graph showing that low-temperature solution oxidation results in self-limiting growth.

FIG. 2 is a graph showing that the low-temperature solution oxidation results in self-limiting growth. A variation in the thickness of a copper oxide layer according to the oxidation time was measured using a coulometric reduction method. In the coulometric reduction method, a saturated calomel electrode was used as a reference electrode, and a platinum layer was used as a subsidiary electrode. A 0.1 M NaOH water solution was used as an electrolytic solution. Before an experiment was conducted, the electrolytic solution was purged using a $N_2$ gas to prevent oxygen from being reduced at a cathode. The surface area of copper exposed to the electrolytic solution was set to 1 cm', and a current of 1 mA was used. When, it is supposed that CuO formed in the surface of the copper is primarily reduced to copper and then $Cu_2O$ is reduced to copper in the alkali solution (0.1 M NaOH), the thickness of copper oxide can be expressed as shown in Equation 1. Here, a permitted error limit was within 10%.

$$\delta = QV/nFA = itA/nFA \qquad (1)$$

In Equation 1, δ is the thickness of a reactant, Q is cathodic charge, n is the number ($Cu_2O$:2, CuO:2) of valence electrons that participate in a reaction, F is a Faraday constant, A is the reaction area, and V is a volume per mol of a reactant. The volume per mol of $Cu_2O$ is 23.9 cm'/mol, and the volume per mol of CuO is 12.4 cm'/mol.

As shown in FIG. 2, copper oxide grew to 0.15 µm for an oxidation time of 2 minutes and then did not grow any more. That is, after 2 minutes had elapsed, self-limiting growth occurred. The thickness of the copper oxide, measured using coulometric reduction method, is an average thickness. The reason why the average thickness (0.15 µm) of the copper oxide layer is less than the length (0.8 µm) of the resultant copper nanowires, which is measured using the coulometric reduction method, is presumably that there are many gaps between the copper oxide nanowires.

The resultant copper oxide nanowires can be directly used as emitter tips. Alternatively, a reduction reaction can be further performed on the copper oxide nanowires to reduce the copper oxide nanowires to copper nanowires, and thus the copper nanowires can be used as emitter tips.

The reduction reaction for reducing the copper oxide nanowires to the copper nanowires is as follows. The substrate where the copper oxide nanowires are formed is loaded into a thermal diffusion chamber. Thereafter, a ramp-up process is performed such that the thermal diffusion chamber is heated to a reduction temperature, preferably, 400° C. to 450° C.

During the ramp-up process, an inert gas, for example, an Ar gas, is injected into the thermal diffusion chamber at a flow rate of about 20 sccm to 40 sccm. If the thermal diffusion chamber is heated to a desired reduction temperature, a reduction gas is injected into the thermal diffusion chamber along with the inert gas, thereby reducing the copper oxide nanowires to the copper nanowires. The reduction gas is supplied at a flow rate of about 10 sccm to 30 sccm for an amount of time of about 30 minutes to 60 minutes. A $H_2$ gas is used as the reduction gas.

If the reduction reaction is completed, the supply of the reduction gas is interrupted. Thus, a ramp-down process is performed. That is, while the thermal diffusion chamber is being cooled, the reduction gas is exhausted using an inert gas from the chamber via an exhaust port. If the ramp-down process is completed, the substrate is unloaded from the chamber.

The reduction reaction is performed at a temperature that is lower than a strain temperature of the substrate, which is widely used as a substrate of display devices or light sources, i.e., 450° C. or less. Thus, it is possible to grow copper nanowires without straining the substrate.

Plasma processing for forming copper nanowires can be performed as follows. A substrate where copper oxide nanowires are formed is loaded into a plasma processing chamber. Next, an atmosphere in the plasma processing chamber is lowered using a vacuum pump to a very low pressure, preferably, $10^{-6}$ Torr or less.

Thereafter, a plasma generating gas is injected into the plasma processing chamber at a flow rate of about 20 sccm to 40 sccm. If the plasma generating gas reaches a steady state, a plasma generating power of about 50 W to 100 W is applied to the plasma processing chamber. The plasma generating gas is a $H_2$ gas, and the plasma processing chamber is maintained in an atmosphere of about 10 mTorr to 50 mTorr during the plasma processing.

If the plasma processing is completed, the supply of the plasma generating power is interrupted and simultaneously the supply of the plasma generating gas is also interrupted. If the plasma generating gas remaining in the plasma processing chamber is sufficiently exhausted, the plasma processing chamber is vented. If the venting of the plasma processing chamber is completed, the substrate is unloaded from the chamber.

Hereinafter, a method of manufacturing a display device or a light source using the above-described low-temperature formation method for emitter tips including copper oxide nanowires or copper nanowires will be described. Although an FED is used as the display device and a white light source is used as the light source in the embodiments of the present invention, the present invention is not limited thereto and other various display devices or light sources can be used instead.

FIGS. 3 through 6 are cross-sectional views illustrating a method of manufacturing an FED using the low-temperature formation method for emitter tips including copper oxide nanowires or copper nanowires according to the present invention, according to an embodiment of the present invention.

Figure 3:
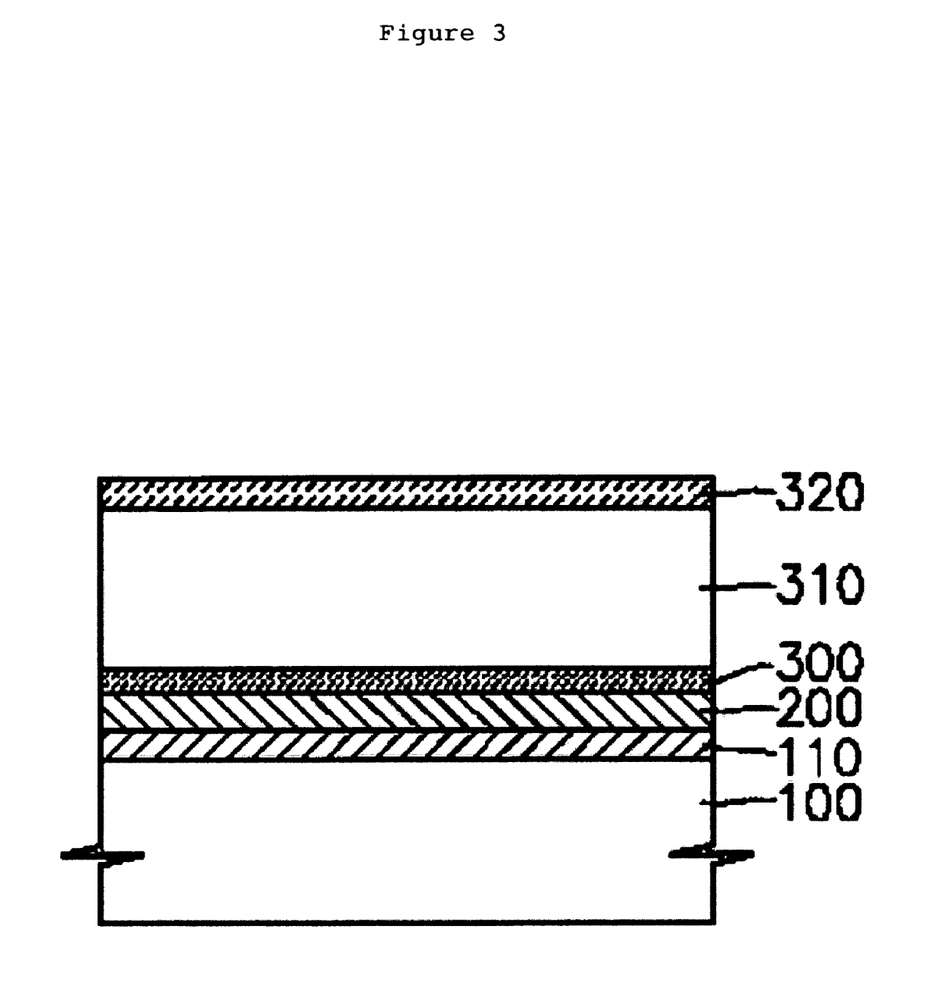
FIGS. 3 through 6 are cross-sectional views illustrating a method of manufacturing a field emission display (FED) using the low-temperature formation method of the present invention, according to an embodiment of the present invention.

Referring to FIG. 3, a first insulating layer 110 is formed on a large-sized lower substrate 100. The lower substrate 100 is formed of glass, quartz, silicon, or alumina ($Al_2O_3$). The first insulating layer 110 is formed to prevent the lower substrate 100 from reacting on a cathode electrode 200, which is formed in a subsequent process. If necessary, the formation of the first insulating layer 110 may be omitted. The cathode electrode 200 is formed of a chrome layer, a titanium layer, or a tungsten layer.

Thereafter, a copper layer 300 is formed on the cathode electrode 200. The copper layer 300 is formed to a thickness of several nm to several hundred nm, preferably, 400 nm to 500 nm, using thermal deposition, electron beam deposition, or sputtering. A second insulating layer 310 is formed on the copper layer 300, and then a metal layer 320 for a gate electrode is formed on the second insulating layer 310. The metal layer 320 for the gate electrode is formed of chrome, titanium, or palladium. The metal 320 for the gate electrode is also formed using electron beam deposition, thermal deposition, or sputtering. Preferably, the first insulating layer 110, the cathode electrode 200, the copper layer 300, the second insulating layer 310, and the metal layer 320 for the gate electrode are formed at a temperature that is lower than a strain temperature of the lower substrate 100.

Figure 4:
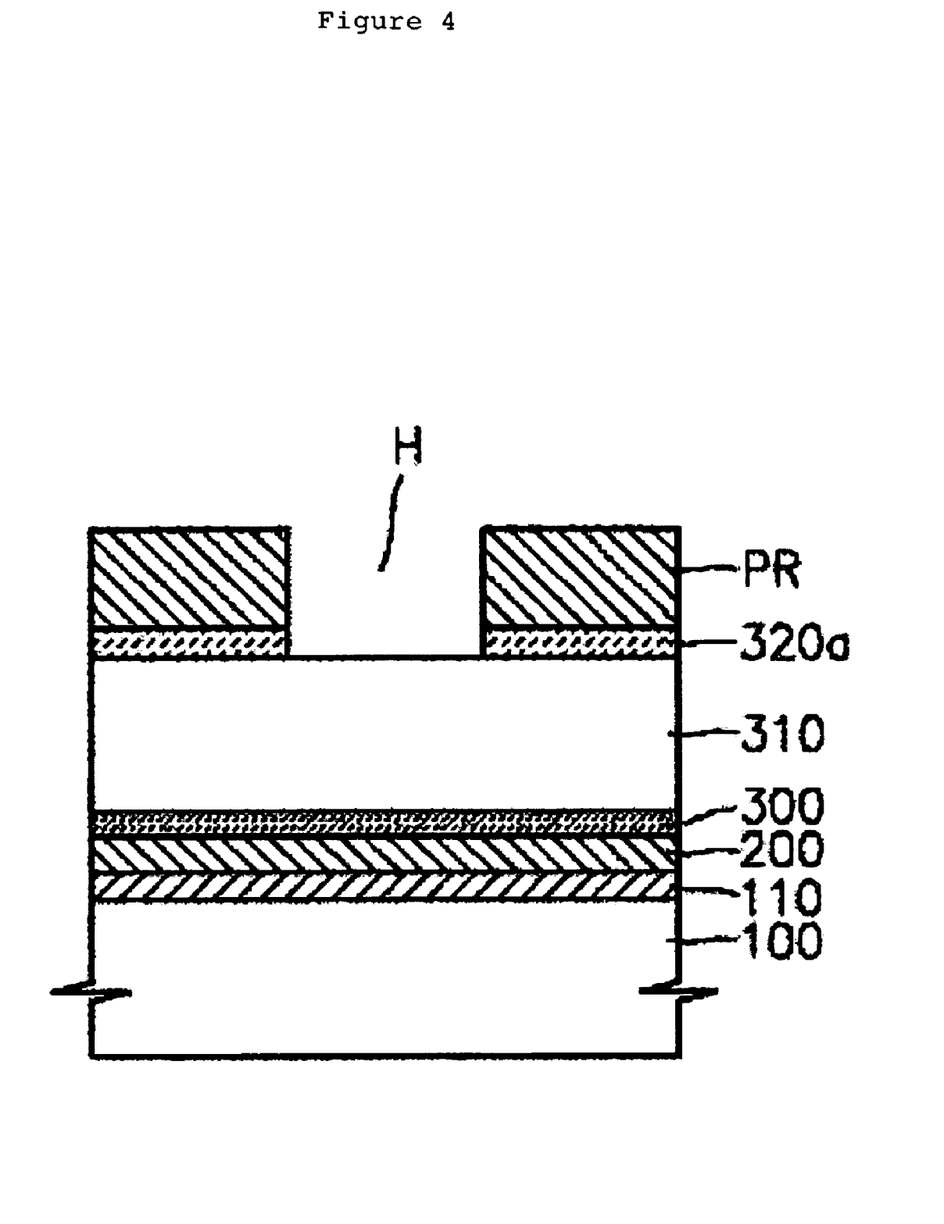

Referring to FIG. 4, a photoresist layer is coated on the metal layer 320 for the gate electrode and patterned to form a photoresist pattern PR. The metal layer 320 for the gate electrode is etched using the photoresist pattern PR as a mask, thereby forming a gate electrode 320a. The gate electrode 320a defines a hole H, which exposes the surface of the second insulating layer 310. The hole H has a diameter of 0.8 µm to 5.0 µm, and an interval between adjacent holes is in the range of 3.0 µm to 15.0 µm.

Figure 5:
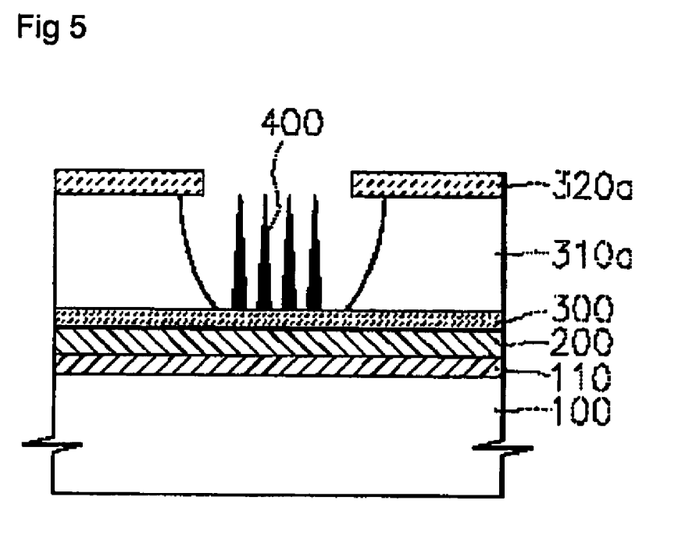

Referring to FIG. 5, the photoresist pattern PR is removed, and the second insulating layer 310 is etched using the gate electrode 320a as an etch mask, thereby forming a second insulating pattern 310a. The surface of the copper layer 300 is exposed by the second insulating pattern 310a. Optionally, the photoresist pattern PR may not be removed. Thus, after the second insulating pattern 310a is formed using both the photoresist pattern PR and the gate electrode 320a as an etch mask, the photoresist pattern PR may be removed.

The above-described low-temperature solution oxidation is performed on the resultant structure where the second insulating pattern 310a is formed, thereby forming emitter tips 400 including copper oxide nanowires on the surface of the copper layer 300. The low-temperature solution oxidation is performed at a low temperature of 100° C. or less for a short amount of time. Thus, the first insulating layer 110, the cathode electrode 200, the second insulating pattern 310a, and the gate electrode 320a are not strained by an oxide solution. Preferably, the low substrate 100, the first insulating layer 110, the cathode electrode 200, and the second insulating layer 310a, and the gate electrode 320a are formed of materials that are resistant to the oxide solution and protected from the strain. Since the low-temperature solution oxidation was described above, a detailed description thereof will not be repeated here.

If copper nanowires, which are more electrical conductive and have a smaller work function than the copper oxide nanowires, are used as the emitter tips 400, the copper oxide nanowires are reduced to the copper nanowires as described above. That is, a substrate 100 including emitter tips 400 including copper oxide nanowires is loaded into a thermal diffusion chamber, and a reduction gas is injected into the thermal diffusion chamber to reduce the copper oxide nanowires to copper nanowires. Thus, the emitter tips 400 including the copper nanowires can be formed.

Figure 6:
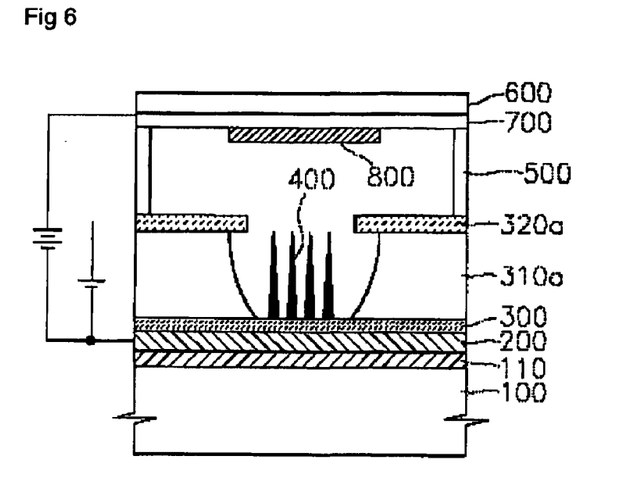

Referring to FIG. 6, spacers 500 are formed on the gate electrodes 320a. Next, an anode electrode 700 is formed on a prepared upper substrate 600, and phosphor 800 for emitting light is adhered onto the anode electrode 700. The phosphor 800 can be red phosphor, such as $Y_2O_2S$:Eu, $Gd_2O_3$:Eu, and $Y_2O_3$:Eu, green phosphor, such as $Gd_2O_2S$:Tb, $SrGa_2S_4$:Eu, ZnS:Cu, Cl, $Y_3Al_5O_{12}$:Tb, and $Y_2SiO_5$:Tb, or blue phosphor, such as ZnS:Ag, Me, and $Y_2SiO_5$:Ce. The upper substrate 600 is formed of a transparent material (e.g., glass) to emit light of the phosphor 800. The anode electrode 700 is also formed of a transparent material, such as indium tin oxide (ITO). Thereafter, the substrate 600 onto which the anode electrode 700 and the phosphor 800 are adhered is turned upside down, mounted on the spacers 500, and molded in vacuum, thus completing an FED. As a result, the emitter tips 400 are spaced a predetermined distance apart from the phosphor 800 formed on the upper substrate 600 by the spacers 50.

If a certain voltage (e.g., several tens of V) is applied to between the gate electrode 320a and the cathode electrode 200 of the completed FED, electrons are emitted from the emitter tips 400 including the copper oxide nanowires or the copper nanowires due to quantum mechanical tunnelling. The emitted electrons collide with the phosphor 800 due to a very high voltage (e.g., several hundred to several thousands V) applied to the anode electrode 700. Thus, electrons in the phosphor 800 are excited by the energy of the colliding electrons and then fall, thus generating light. The FED shown in FIG. 6 is a triode FED including three electrodes 200, 320a, and 700. Of course, the method of the present invention can be applied to a diode FED including two electrodes.

Figure 7:
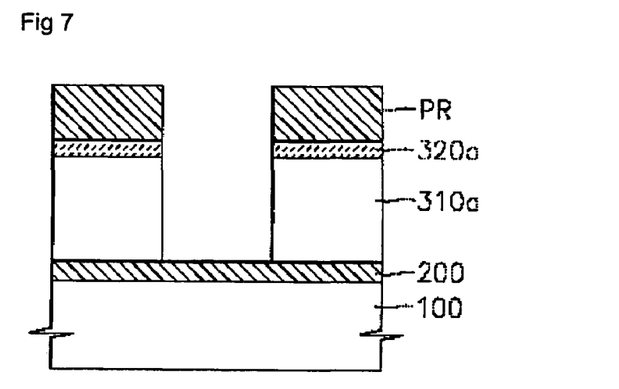
FIGS. 7 through 9 are cross-sectional views illustrating a method of manufacturing an FED using the low-temperature formation method of the present invention, according to another embodiment of the present invention.
Figure 8:
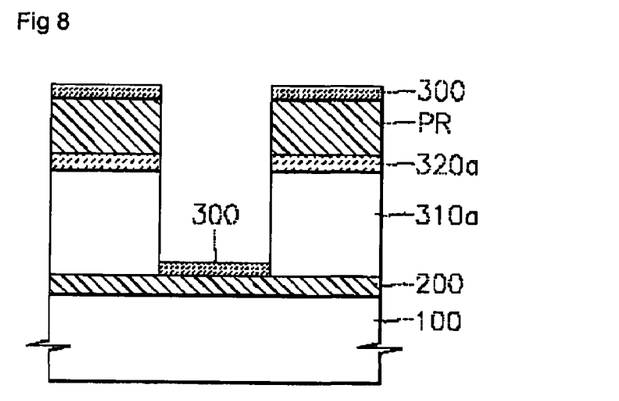
Figure 9:
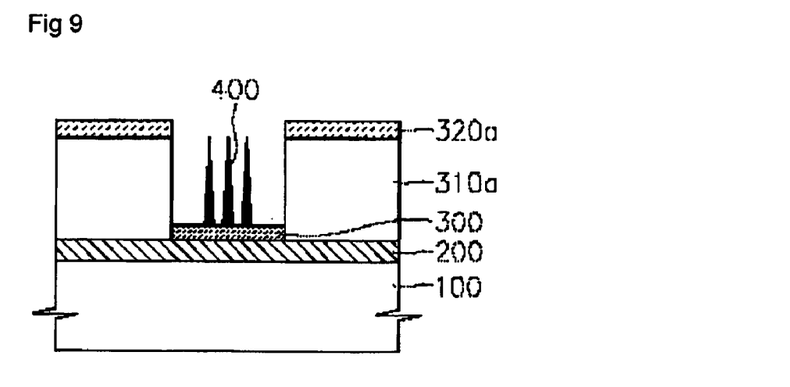

FIGS. 7 through 9 are cross-sectional views illustrating a method of manufacturing an FED using the low-temperature formation method for emitter tips including copper oxide nanowires or copper nanowires according to the present invention, according to another embodiment of the present invention. The same formation methods, thickness, shape, size, and material of elements as in the first embodiment will not be repeated here.

Referring to FIG. 7, unlike in the first embodiment, before a copper layer is formed, a cathode electrode 200, an insulating layer 310, a metal layer 320 for a gate electrode, and a photoresist pattern PR are sequentially formed on a large-sized lower substrate 100. The metal layer 320 for the gate electrode and the insulating layer 310 are sequentially etched using the photoresist pattern PR as an etch mask, thereby forming a gate electrode 320a and an insulating pattern 310a. As a result, the surface of the cathode electrode 200 is exposed.

Referring to FIG. 8, a copper layer 300 is formed on the entire surface of the resultant structure of FIG. 7. Thus, the copper layer 300 is formed on the surfaces of the photoresist pattern PR and the cathode electrode 200.

Referring to FIG. 9, a lift-off process is performed such that the photoresist pattern PR and the copper layer 300 deposited thereon are removed. Thus, the copper layer 300 remains only on the surface of the cathode electrode 200. Thereafter, copper oxide nanowires are formed using low-temperature solution oxidation, or copper nanowires are formed by combining low-temperature solution oxidation with a reduction process. Thus, emitter tips 400 are completed. Subsequently, as in the first embodiment, spacers are formed and an upper substrate on which an anode electrode and phosphor are stacked is mounted on the spacers and molded in vacuum, thus completing an FED.

Figure 10:
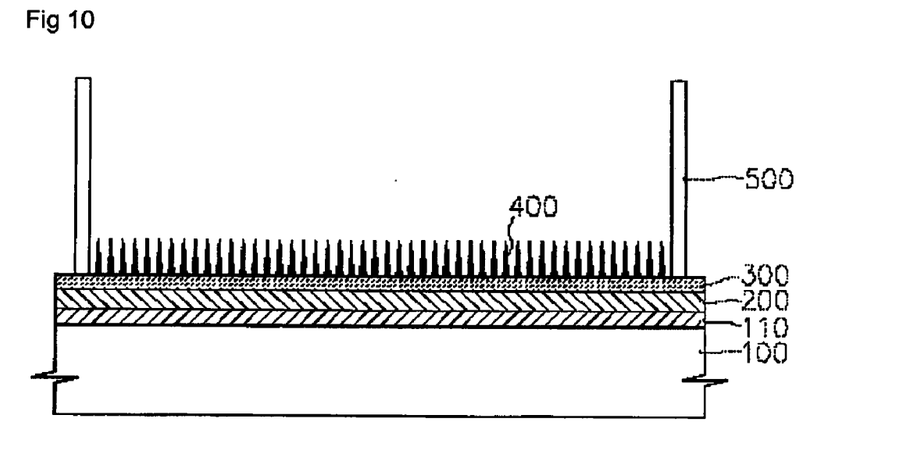
FIGS. 10 and 11 are cross-sectional views illustrating a method of manufacturing a white light source using the low-temperature formation method of the present invention, according to yet another embodiment of the present invention.
Figure 11:
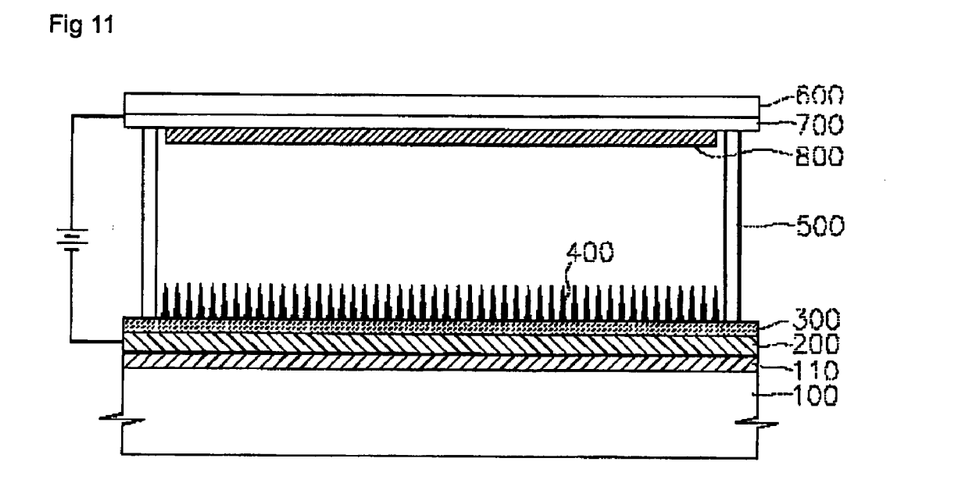

FIGS. 10 and 11 are cross-sectional views illustrating a method of manufacturing a white light source using the low-temperature formation method of the present invention, according to yet another embodiment of the present invention.

Referring to FIG. 10, a cathode electrode 200 and a copper layer 300 are sequentially formed on a lower substrate 100. Next, copper oxide nanowires are formed using low-temperature solution oxidation, or copper nanowires are formed by combining low-temperature solution oxidation with a reduction process. Thus, emitter tips 400 are formed. Spacers 500 are formed on the copper layer 300 on which the emitter tips 400 are formed.

Referring to FIG. 11, a transparent electrode 700 and phosphor 800 are formed on an upper substrate 600, and the upper substrate 600 is mounted on the spacers 500 such that the surface of the phosphor 800 faces the emitter tips 400. The phosphor 800 is formed of a fluorescent material that emits white light, for example, a fluorescent material that emits short-wavelength white light, such as $3Ca_3(PO_4)_2$ CaFCl/Sb and Mn, or a fluorescent material that emits three-wavelength white light, such as $Y_2O_3$:Eu, $CeMaA_{11}O_{19}$:Tb, and $BaMg_2Al_{16}O_7$:Eu. Thus, the resultant structure is molded in vacuum, thereby completing a white light source.

If a certain voltage is applied to between the cathode electrode 200 and the anode electrode 700 of the completed white light source, electrons are emitted from the emitter tips 400. Since the emitter tips 400 including the copper oxide nanowires or the copper nanowires have pointed ends and a suitable for emission of electrons, the electrons are efficiently emitted from the emitter tips 400. Accordingly, an electric field applied to between the cathode electrode 200 and the anode electrode 700 can be lowered. Also, the emitter tips 400 including the copper oxide nanowires or the copper nanowires are arranged densely. Thus, the density of the electrons that are incident on the phosphor 800 is so high that the phosphor 800 can generate light having a very high brightness.

If the copper oxide nanowires or the copper nanowires are used as the emitter tips 400 of the white light source, since it is not required to use mercury, the present invention is environmentally friendly. Light is emitted in only one direction and thus a lamp cover for the reflection of the light is not required. Also, as the white light source of the present invention employs a direct current (DC) power, an inverter for applying an alternating current (AC) power is not needed. Therefore, the white light source of the present invention can be widely used in various fields.

Figure 12:
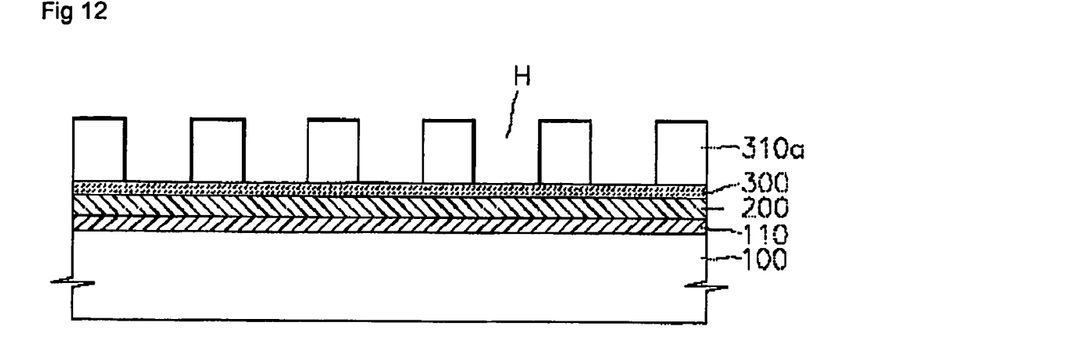
FIGS. 12 through 14 are cross-sectional views illustrating a method of manufacturing a white light source using the low-temperature formation method of the present invention, according to further another embodiment of the present invention.
Figure 13:
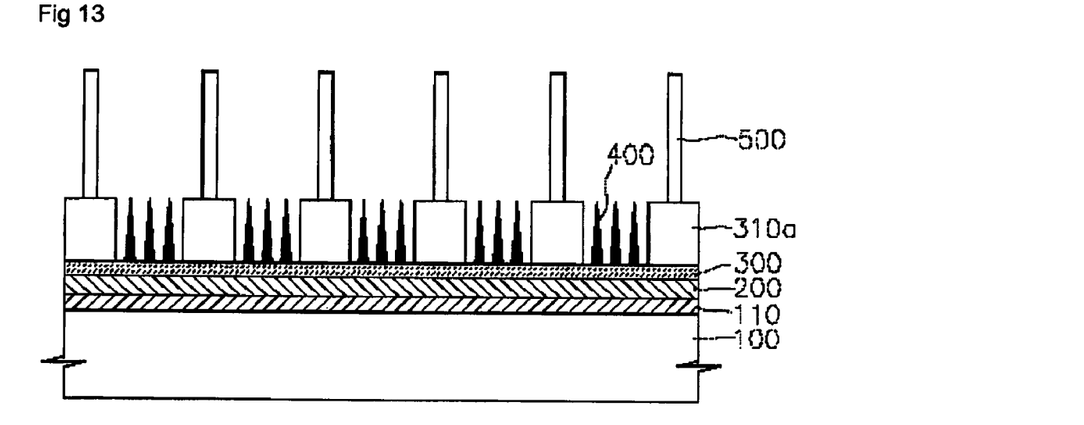
Figure 14:
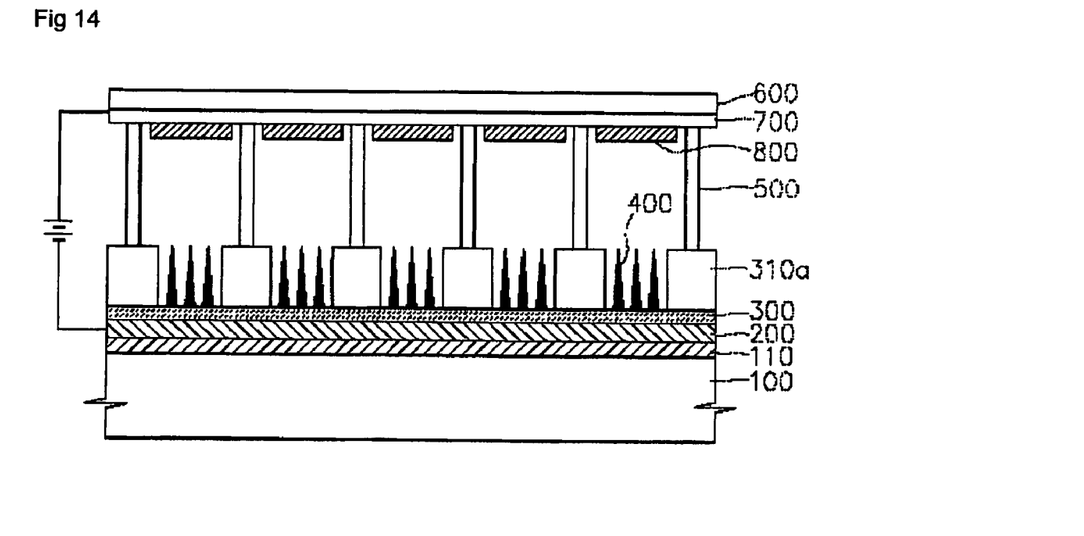

FIGS. 12 through 14 are cross-sectional views illustrating a method of manufacturing a white light source using the low-temperature formation method of the present invention, according to further another embodiment of the present invention. The present embodiment differs from the third embodiment in that emitter tips 400 are grouped into several groups and each group constitutes one cell.

Referring to FIG. 12, a first insulating layer 110, a cathode electrode 200, a copper layer 300, and a second insulating layer 310 are sequentially formed on a lower substrate 100 and patterned using photolithography and etching processes, thereby forming a second insulating pattern 310a. The second insulating pattern 310a defines a plurality of holes H, which expose the copper layer 300. Here, the second insulating pattern 310a is formed such that each of the holes H has a diameter and an interval suitable for defining a cell.

Referring to FIG. 13, copper oxide nanowires are formed using low-temperature solution oxidation, or copper nanowires are formed by combining the low-temperature solution oxidation with a reduction process. Thus, emitter tips 400 are formed on the copper layer 300, which is exposed by the holes H of the insulating pattern 350. Spacers 500 are formed on the second insulating pattern 310a where the emitter tips 400 are formed.

Referring to FIG. 14, an upper substrate 600 on which an anode electrode 700 and phosphor 800 are stacked is mounted on the spacers 500 such that the phosphor 800 faces the emitter tips 400 and molded in vacuum, thus completing a white light source. Preferably, the phosphor 800 is patterned such that portions of the anode electrode 700, which is transparent, supported by the spacers 500 are exposed.

According to a low-temperature formation method of the present invention, copper oxide nanowires or copper nanowires can be formed densely such that they have a pointed shape suitable for emitter tips and have a length suitable for the emitter tips due to self-limiting growth. In particular, since the emitter tips can be formed at a low temperature, the present invention can be applied to a glass substrate, which is widely used for FEDs and light sources. Also, the manufacture of emitter tips is simple, thus reducing the manufacturing cost.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. A low-temperature formation method for emitter tips, the method comprising:

preparing a substrate having an exposed copper surface; and allowing the copper surface to contact an oxide solution at a low temperature of 100° C. or less to grow copper oxide nanowires on the surface of the substrate.

2. The method of claim 1, wherein the oxide solution is a mixture of a $NaCl_2$ water solution and a NaOH water solution.

3. The method of claim 2, the oxide solution further includes a $Na_3PO_4$ water solution.

4. A field emission display comprising the emitter tips manufactured using the method according to claim 1.

5. A light source comprising the emitter tips manufactured using the method according of claim 1.

6. A low-temperature formation method for emitter tips, the method comprising:

preparing a substrate having an exposed copper surface;

allowing the copper surface to contact an oxide solution at a low temperature of 100° C. or less to grow copper oxide nanowires on the surface of the substrate; and supplying a reduction gas to the copper oxide nanowires at a temperature of 450° C. or less to reduce the copper oxide nanowires to copper nanowires.

7. The method of claim 6, wherein the oxide solution is a mixture of a $NaCl_2$ water solution and a NaOH water solution.

8. The method of claim 7, wherein the oxide solution further includes a $Na_3PO_4$ water solution.

9. The method of claim 6, wherein the reduction gas is a $H_2$ gas.

10. A field emission display comprising the emitter tips manufactured using the method according to claim 6.

11. A light source comprising the emitter tips manufactured using the method according to claim 6.

* * * * *